US006856860B2

(12) United States Patent
Stringham et al.

(10) Patent No.: US 6,856,860 B2
(45) Date of Patent: Feb. 15, 2005

(54) SYSTEMS FOR AND METHODS OF DISTRIBUTING MAIL

(75) Inventors: Gary Glen Stringham, Boise, ID (US); Lawrence Bert Newell, Jr., Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 10/613,056

(22) Filed: Jul. 2, 2003

(65) Prior Publication Data

US 2005/0004705 A1 Jan. 6, 2005

(51) Int. Cl.$^7$ .......................... G06F 7/00; G06F 17/00; G07B 17/02; B65B 35/00
(52) U.S. Cl. ...................... 700/223; 700/224; 700/227; 705/406
(58) Field of Search ................................ 700/223, 224, 700/226, 227; 709/206; 705/406; 358/1.13, 1.18

(56) References Cited

U.S. PATENT DOCUMENTS

| 5,983,264 | A | * | 11/1999 | Gardner | ....................... 709/206 |
| 6,195,174 | B1 | * | 2/2001 | Johnson et al. | ............. 358/1.18 |
| 6,337,743 | B1 | * | 1/2002 | Brown et al. | ............... 358/1.13 |
| 6,697,843 | B1 | * | 2/2004 | Carlin et al. | ................ 709/206 |
| 6,732,152 | B2 | * | 5/2004 | Lockhart et al. | ............ 709/206 |

OTHER PUBLICATIONS

U.S. Appl. No. 10/418,542, filed Apr. 17, 2003, Gary Glen Stringham.
Brotman, Stuart; "How the Postman Almost Owned E–Mail"; Technology Review, 3 pp. (Jul. 29, 2002).
Hillebrand, Mary; "Post Office Sees Big Online Opportunity", E–Commerce Times, 3 pp. (May 27, 1999).
Angwin, Julia; "Postal Service to Deliver the E–Mail", Wall Street Journal Online, 3 pp. (Jul. 30, 2000).
Microsoft, "PressPass", Microsoft Press Release, 4 Pages (May 7, 2001).
Royal Mail, "Royal Mail and the Microsoft Network Turn E–Mail into Real Mail at the Touch of a Button", 3 Pages (Apr. 2, 1998).
E Postal News, E–Commerce and Internet Intelligence, "IBM, Others Debut Electronic Post Office–in–a–Box", Issue No. 106, 1 Page (Apr. 22–26, 2002).
Lewell, John, "free Letters by E–Mail for Troops in Kosovo", Internetnews.com, 3 pp. (Jun. 29, 1999).

* cited by examiner

Primary Examiner—Gene O. Crawford

(57) ABSTRACT

A method of distributing mail includes electronically transmitting a print job, and a list of postal addresses of multiple recipients to which the print job is desired to be delivered, from a users location; providing a printer in a postal delivery vehicle; and printing out mail pieces from the print job, for at least some of the multiple recipients, on the printer in the postal delivery vehicle. Alternative methods and various systems for distributing mail are also provided.

47 Claims, 8 Drawing Sheets

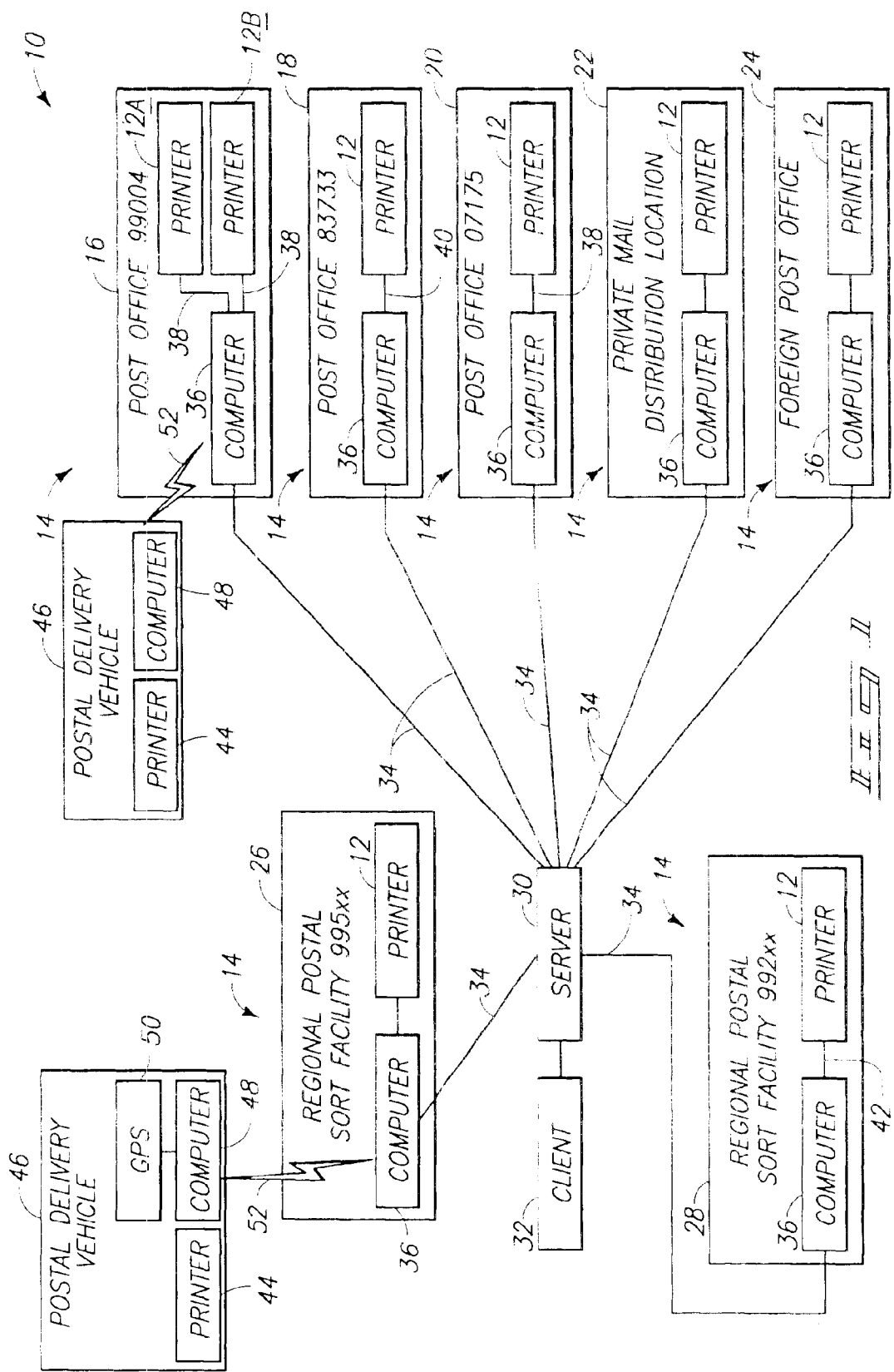

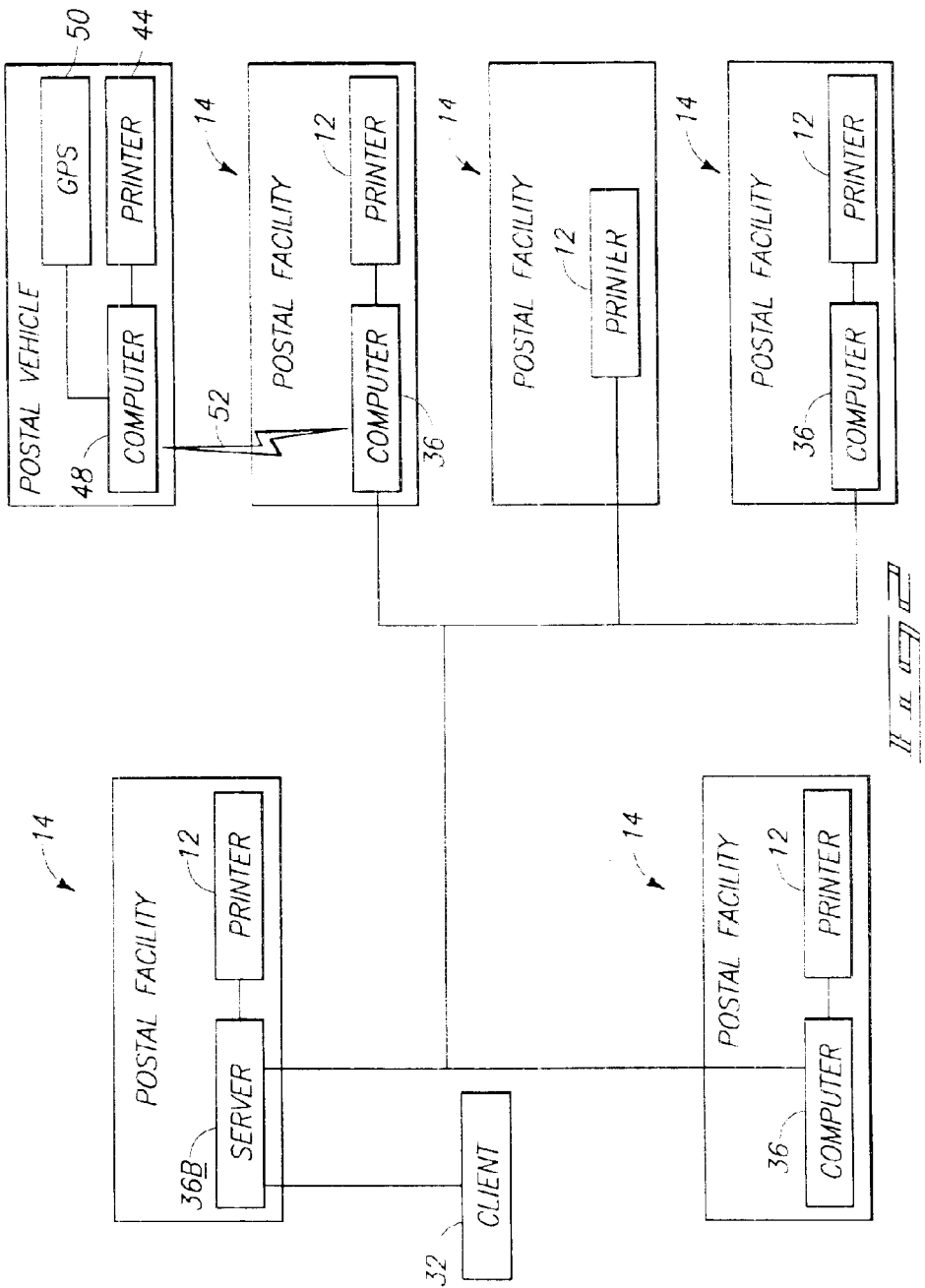

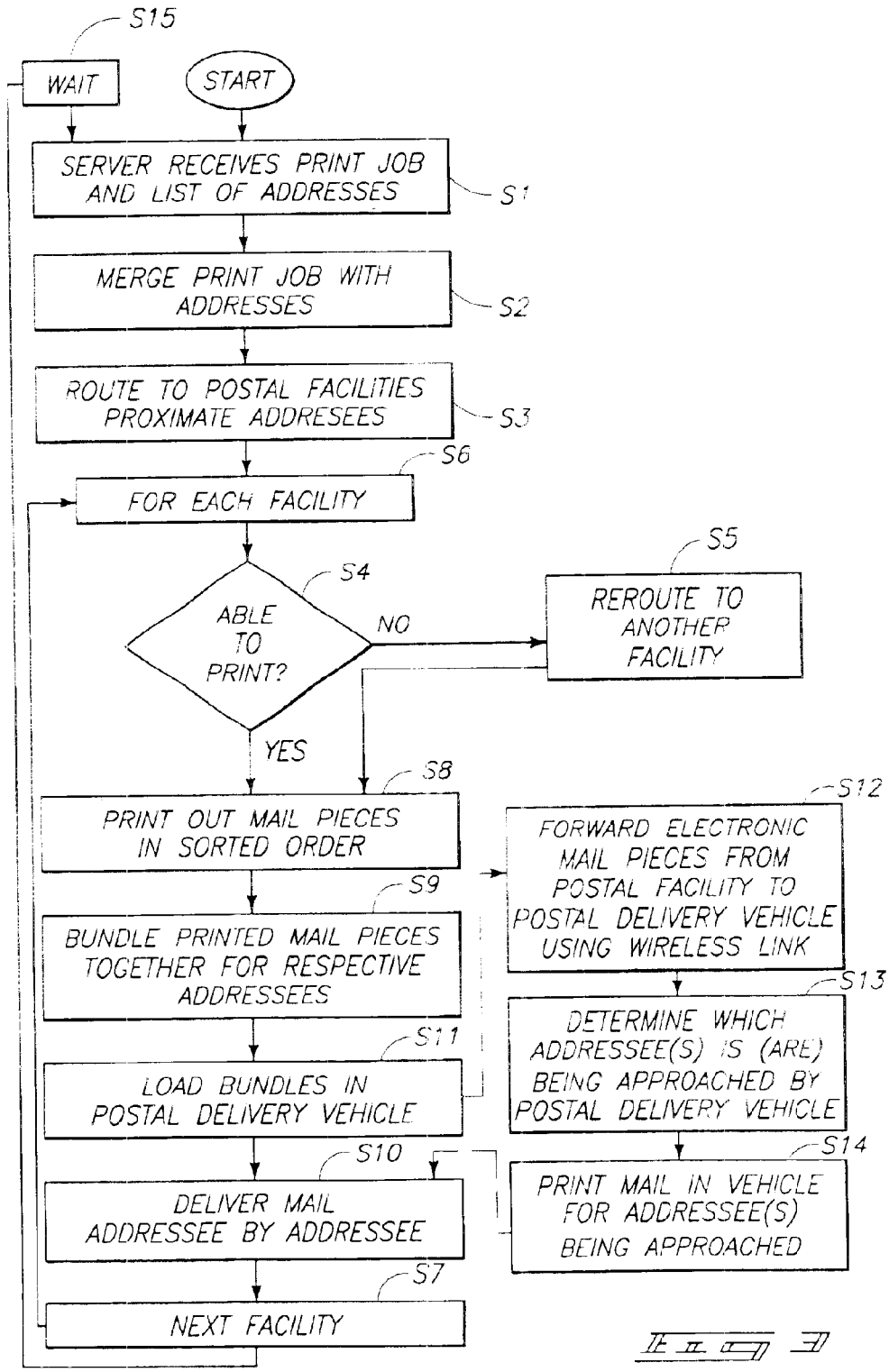

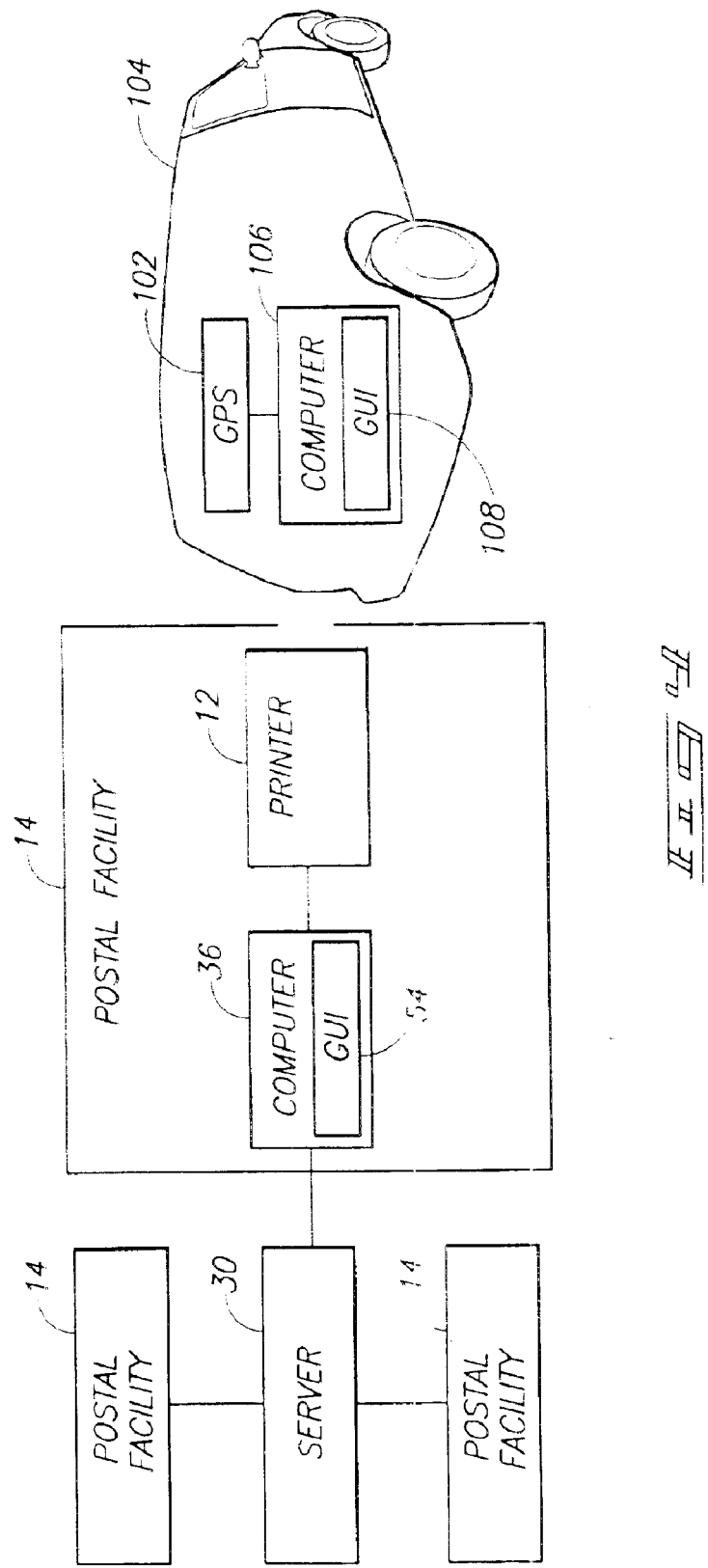

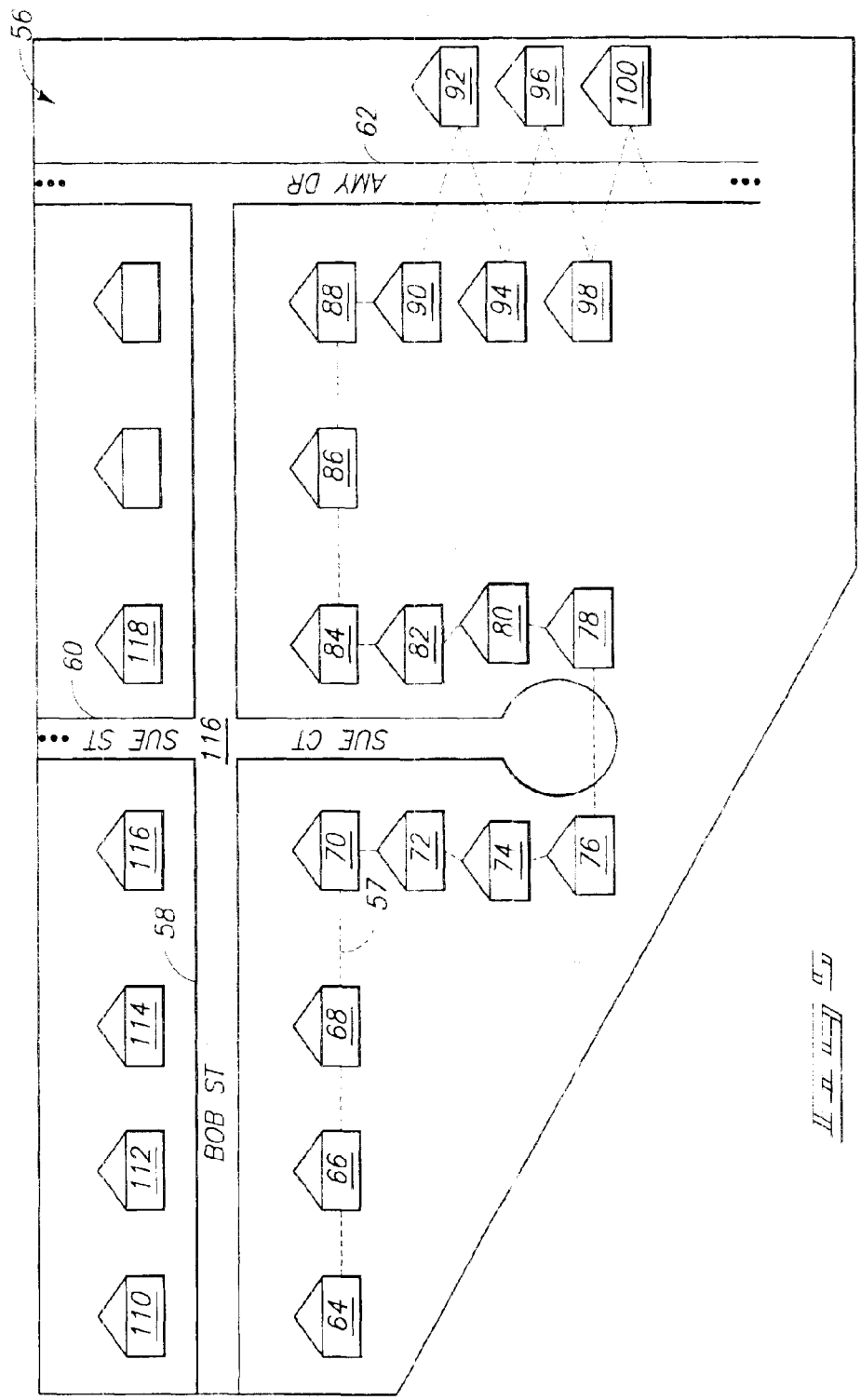

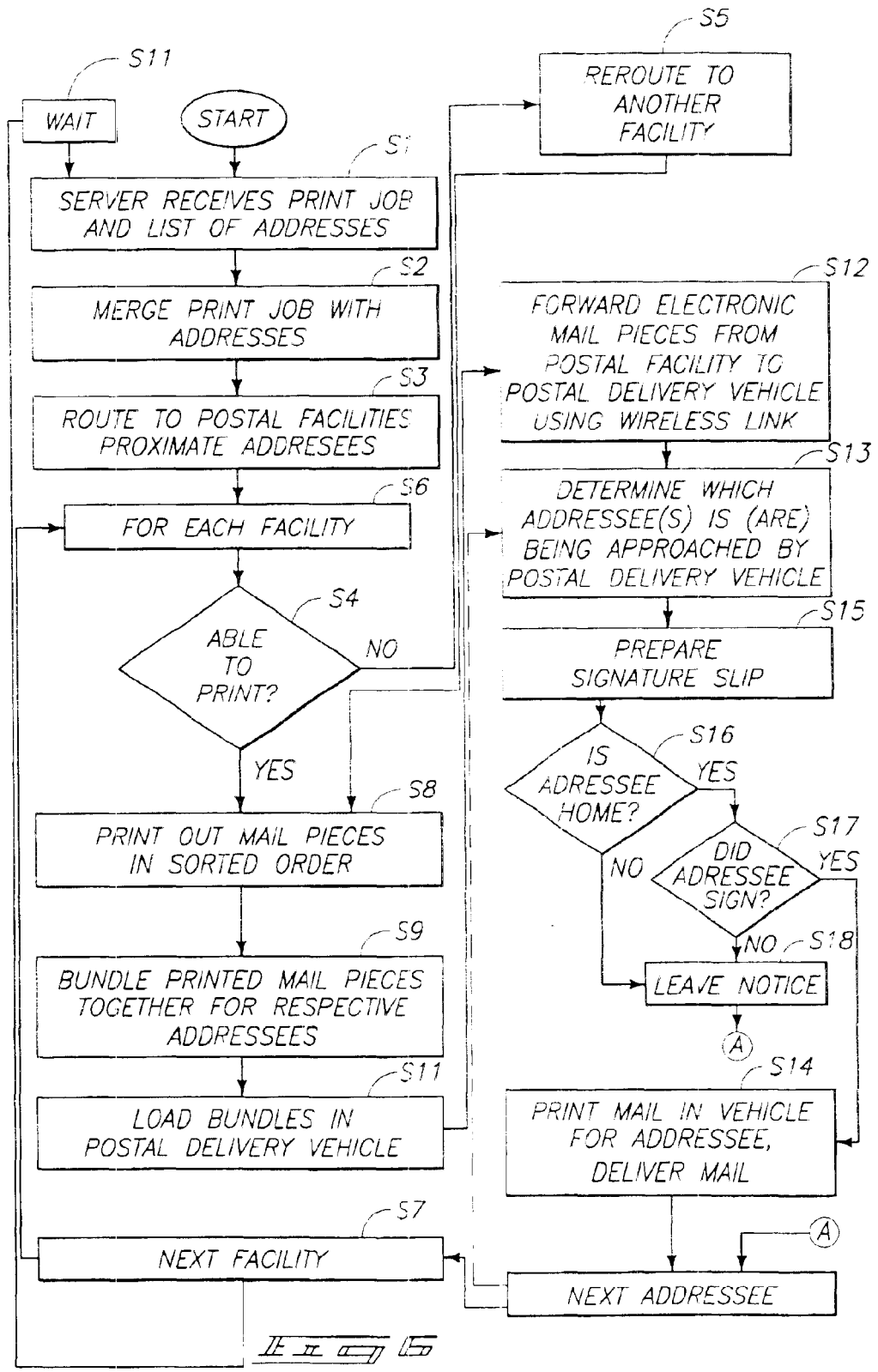

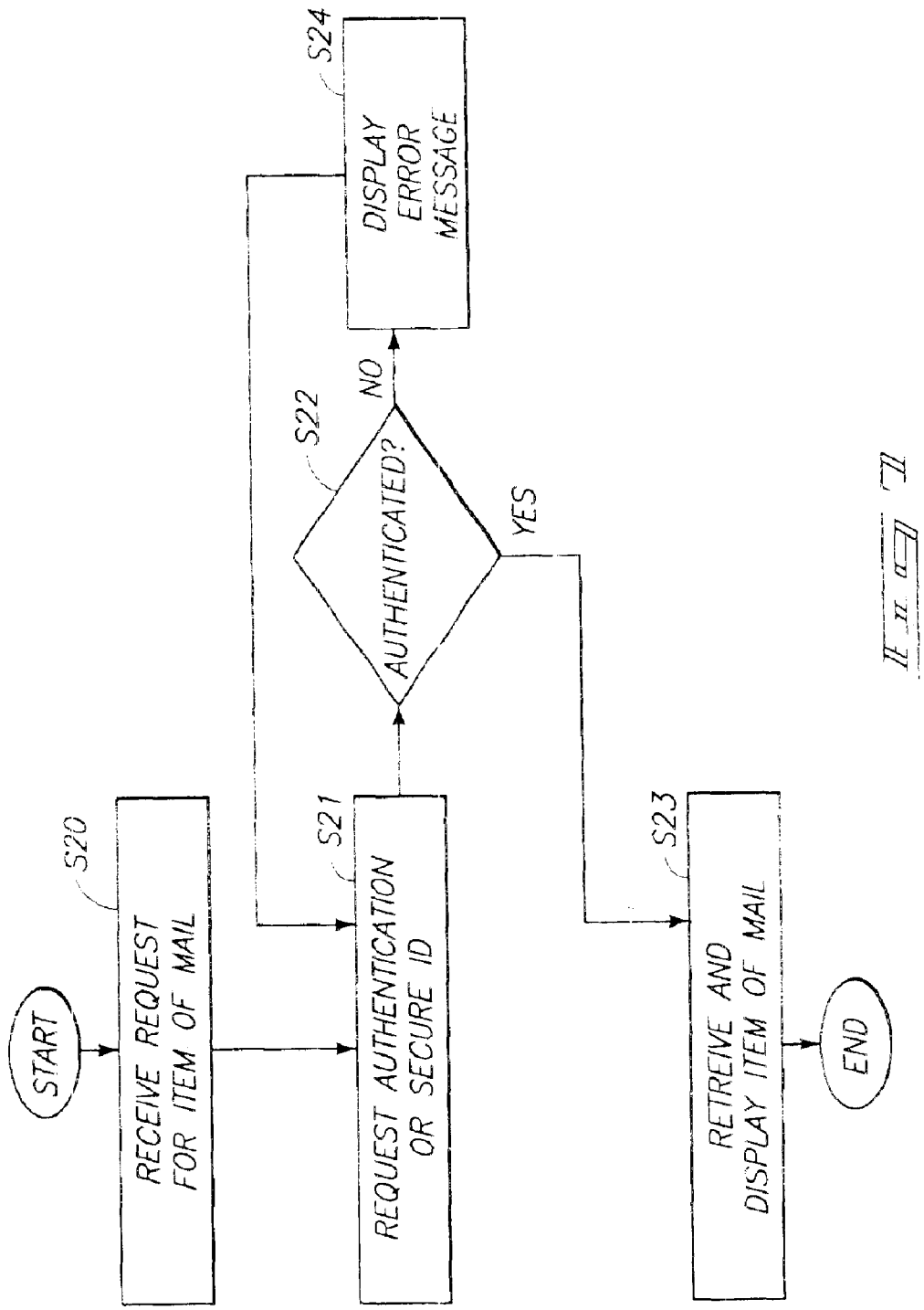

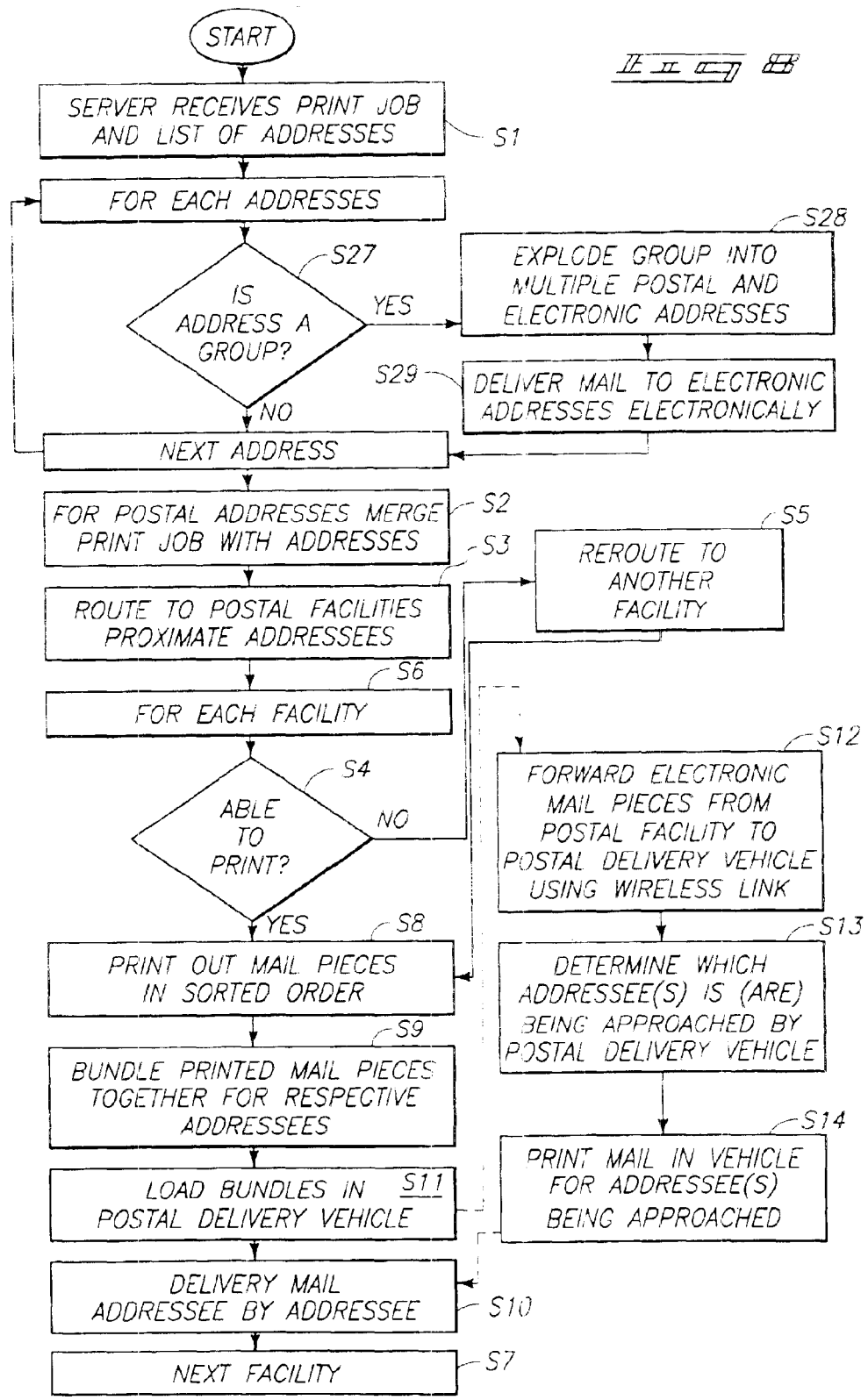

SYSTEMS FOR AND METHODS OF DISTRIBUTING MAIL

FIELD OF THE INVENTION

The invention relates to sorting and delivery of mail. The invention relates to electronic mail and paper mail.

BACKGROUND OF THE INVENTION

Various systems and methods have been proposed for integrating e-mail with postal service regular mail.

An article entitled "How the Postman Almost Owned E-Mail" by Stuart Brotman, Technology Review, Jul. 29, 2002 discusses how the U.S. Postal Service was contemplating a system in January 1982 called E-COM, Electronic Computer-Originated Mail. The article states that E-COM was a message system designed to serve volume mailers, such as Shell Oil and Merrill Lynch, by generating mail from data stored electronically. The service rolled out to 25 post offices and transmitted messages to other cities, which then transformed them into hard copy and delivered them within two days.

An article entitled "Post Office Sees Big Online Opportunity" by Mary Hillebrand, E-Commerce Times, May 27, 1999 discloses a more recent USPS scheme, apparently for use by volume mailers. This article states that with this system, "Mailing Online," users create a document on their own computer, e-mail the document and their mailing lists to the post office, and pay the post office to print, stuff, and mail the document. The article also mentions similar programs run by Canada Post and France's La Poste.

An article entitled "Postal Service to deliver the e-mail" by Julia Angwin, Wall Street Journal Online, Jul. 30, 2000 discloses Postal Service e-mail accounts and contemplates that a teaser marketing message could come by e-mail followed by a more detailed ad or catalog through paper mail. The article also discusses how, in Britain, the Royal Mail and Microsoft Corp. recently launched a service called Relayone. Postal services in Finland and Switzerland are also planning to print e-mail messages and deliver them.

A Microsoft "PressPass" press release dated May 7, 2001 discusses the ability to create correspondence with customers using "bCentral" services and then transfer that document electronically to the post office for printing and mailing.

A press release by Royal Mail describes the "RelayOne" system in greater detail. The article states, on page 2, that Using RelayOne, documents and telegrams sent from anywhere in the world are received at Royal Mail's Electronic Services Center in London, where they are first printed, put in a distinctive envelope and dispatched by First Class mail. The RelayOne system uses a central location from which regular mail is sent.

What is needed is a system and method for efficiently routing and sorting electronic documents that are to be converted to printed documents.

SUMMARY OF THE INVENTION

The invention provides a method of distributing mail, comprising electronically transmitting a print job, and a list of postal addresses of multiple recipients to which the print job is desired to be delivered, from a user's location; providing a printer in a postal delivery vehicle; and printing out mail pieces from the print job, for at least some of the multiple recipients, on the printer in the postal delivery vehicle.

Another aspect of the invention provides a system for distributing mail, comprising a server configured to receive, from a user's client machine, an electronically transmitted print job, and a list of postal addresses of multiple recipients to which the print job is desired to be delivered, from a user's location; a plurality of computers in respective postal facilities, at least selectively coupled to the server, the server being configured to electronically route at least portions of the print job to selected ones of the computers based, at least in part, on proximity of the postal facilities to the respective recipients; and a printer configured to be supported by a postal delivery vehicle associated with one of the postal facilities, the printer being selectively wirelessly coupled to the computer in the associated postal facility and configured to print out at least some mail pieces from the print job that were electronically routed to the associated postal facility.

These and other aspects of the present invention will be discussed in greater detail hereinafter.

DESCRIPTION OF THE DRAWINGS

FIG. 1 is a block diagram of a system for distributing mail in accordance with various embodiments.

FIG. 2 is a block diagram of an alternative system for distributing mail in accordance with various embodiments.

FIG. 3 is a flowchart of a method of distributing mail in accordance with various embodiments.

FIG. 4 is a block diagram of an alternative system for distributing mail in accordance with various embodiments.

FIG. 5 is a view of an example of a graphical user interface produced by a system for distributing mail in accordance with various embodiments.

FIG. 6 is a flowchart of a method of distributing mail in accordance with various alternative embodiments.

FIG. 7 is a flowchart illustrating logic used by a server in displaying mail in response to receiving authentication or a secure ID in accordance with various embodiments.

FIG. 8 is a flowchart of a method of distributing mail in accordance with various alternative embodiments.

DETAILED DESCRIPTION OF THE INVENTION

This disclosure of the invention is submitted in furtherance to the constitutional purposes of the U.S. Patent Laws to promote the progress of science and the useful arts.

Attention is directed to a U.S. patent application Ser. No. 10/418,542, filed Apr. 17, 2003, titled "System for and Method of Distributing Mail", naming as inventor Gary Glen Stringham (Docket No. 10019465-1), assigned to the assignee hereof, and incorporated herein by reference. That application describes systems and methods for distributing mail. This application describes various possible enhancements to those systems and methods.

FIG. 1 shows a system 10 for distributing mail. The system 10 includes a plurality of printers 12. The printers 12 can include low-end to high-end monochrome printers, color printers, or digital press printers. The printers 12 are located in different geographic locations. More particularly, in the illustrated embodiment, the printers 12 are located in postal facilities 14 such as U.S. Postal Service post offices 16, 18, 20, private mail distribution locations 22 (e.g., Mailboxes Etc.™), post offices of other countries 24, regional postal sorting centers 26, 28, or combinations thereof. The postal facilities 14 are located in different geographic areas such as different cities, different areas of cities, different zip codes, and/or different countries. In some facilities (see, for example, facility 16), multiple printers (see, e.g., 12A and 12B) can be included and the list of addresses can be appropriately shared—for example, assuming two printers in a given facility 14, one printer handles A–M and the other printer handles N–Z; one printer handles one part of town, another printer handles another part of town; one printer handles color, another printer handles black and white; one printer handles folded paper, another handles postcards or flyers, etc.

The system 10 includes a server 30 configured to receive, from a client machine 32 (a user's computer or terminal), an electronically transmitted print job and a list of addresses of multiple recipients to which the print job is desired to be delivered. The server 30, in operation, electronically routes the print job and at least portions of the list of addresses via a network 34 to selected ones of the printers 12. The network 34 includes or makes use of a postal service network (e.g., a WAN), the Internet, satellite or RF links, or land lines.

The server 30, in operation, selects printers 12 or postal facilities 14 based on proximity of the printers 12 or postal facilities 14 to the addresses of the recipients.

In some embodiments, the system 10 further comprises computers 36 located in at least some of the different geographic locations in which the printers 12 are located. The computers 36 are coupled with the respective printers 12. The server 30 communicates with the printers 12 via the computers 36. The computers 36, if included, in operation merge the print job with respective addresses of the list to define multiple separate individually addressed electronic files or electronic mail pieces. The computer 36 in each postal facility 14 is configured to cause the printer 12 or printers 12A and 12B in that facility to print out the electronic mail pieces for respective addressees in an order corresponding to a predetermined delivery route, such as a carrier sort route, a rural route, or a regional truck route. This saves substantial effort for the postal facility 14. In one or more of the geographic locations, a local area network 38 is provided to couple one or more printers 12 to a computer 36. Alternatively, in one or more of the geographic locations, printers 12 are directly coupled to the computers 36 (e.g., using a parallel port 40 or wireless link 42), instead of via a local area network 38.

In alternative embodiments, the server 30 performs the merging and the sorting. In these embodiments, the server 30 merges the print job with respective addresses of the list to define multiple separate individually addressed electronic mail pieces.

In one alternative embodiment, shown in FIG. 2, a client machine 32 communicates with a computer 36B in one of the postal facilities or geographic locations, and that computer 36B communicates with printers 12 in other postal facilities or geographic locations, either directly or via other computers 36. The computer 36B communicates with the other computers 36 or printers 12 using WANs, LANs, and/or the Internet.

FIG. 3 illustrates a method in accordance with various embodiments. In step S1, a user electronically transmits a print job and a list of addresses of multiple recipients to which the print job is desired to be delivered from a user's location 32 to the server 30. The print job is mergable with the addresses of the list to define multiple separate individually addressed electronic mail pieces.

In step S2, the print job is merged with respective addresses of the list to define multiple separate individually addressed electronic mail pieces. In some embodiments, the merging is performed by the server 30. In other embodiments, the merging is performed by one or more of the computers 36.

In step S3, the individually addressed electronic mail pieces are electronically routed from the server 30 to respective distribution centers 14 separate from the user's location. In some embodiments, the server 30 selects the distribution centers 14 based on the proximity of the distribution centers to the addresses of the individually addressed pieces. In some embodiments, the distribution centers may be postal facilities described above. From the sender's perspective, this is distributed printing. The sender's mail is being printed on printers 12 near each recipient. In some embodiments, the merging takes place before the routing—in other embodiments, the routing takes place before the merging.

In step S8, at distribution centers 14 for which an individually addressed electronic mail piece has been received, mail pieces are printed out for respective addressees in an order corresponding to a predetermined delivery route, such as a carrier sort route, P.O. Box numeric order, truck route, rural route, intercity route, etc. For P.O. Boxes, the printer still prints the mail pieces in order, making it easier for the postal worker to quickly put the mail pieces in the boxes. Thus, the entire front end sorting of conventional mail is bypassed. Sorting instead is performed by computer. In some embodiments, at one or more of the distribution centers 14, multiple mail pieces for a given addressee are printed together. Therefore, all printed mail for a given household, whether it is addressed to the man of the house, the woman of the house, to a child, to Postal Patron or Current Resident, is together in the pile. In other words, machinery does the sorting of the mail for the Post Office, not a postal worker.

In some embodiments, the mail pieces are printed at night or outside normal business hours. As illustrated by step S15, in some embodiments, one printing occurs at some regular interval, each night, or from time to time, and print jobs received from users after a printing has been completed are saved until the next time for printing (e.g., the next night).

Because confidential information may be being printed, the printed pieces of mail for each recipient are bundled or secured, in some embodiments, in step S9. In certain embodiments, mail pieces for each addressee are bundled together and covered such that the address of the addressee is visible. More particularly, mail pieces for each addressee are bundled together such that content of the mail pieces, other than the address of the addressee, is not visible. Using a standard paper handling device, the pile of mail for each recipient is all put into one envelope or shrink-wrapped with the recipient's address visible. In some embodiments, the shrink-wrap is clear, but a non-confidential piece of mail or sheet (e.g., an advertisement) is placed on the top and/or bottom of the pile. In other embodiments, plastic envelopes are used having a clear area as a window for the address and the rest of it obscured, hiding the rest of the top sheet. This bundling is advantageous in that the postal carrier can easily pick up the whole bundle of printed pieces of mail for one recipient, rather than leafing through the pile to find where the mail for one recipient ends and the mail for the next one begins. Because of the way most mailboxes are constructed, in some embodiments, the pile or individual pieces for an addressee are folded before being stuffed in an envelope or shrink-wrapped.

In some embodiments, for at least some addressees, in step S9 mail pieces for that addressee are bundled together in a plastic envelope having a clear area defining a window though which an address can be seen, and the rest of the envelope obscures the contents of the envelope.

In certain embodiments, printed mail pieces for each addressee are shrink-wrapped together.

In certain embodiments, if all printers at one of the geographic locations or facilities are not able to print, a mail piece for an addressee is printed at a nearby geographic location or facility. In these embodiments, in step S4, a determination is made as to whether printing is possible at a geographic location or facility. If so, the printing takes place at that location or facility at step S8. If not, printing takes place at a nearby facility in a revised order corresponding to the delivery routes at a new location. More particularly, the print job is rerouted in step S5. This test is performed for each facility or printer using looping logic in step S6 and S7.

Alternatively, the original order can be maintained and the printed pieces printed at the alternate facility can be transferred to the proper facility for delivery. Because there are many post offices in each country, if the printer in one post office goes down, the jobs can be sent to a neighboring postal facility for printing and bundling and then transported back to the office with the down printer for delivery.

In step S10, the printed mail is delivered. In some embodiments, the operator walks up to the printer, pulls out the stack of mail for a given route, and puts it on the delivery vehicle or pouch for that route. As the postal carrier drives or walks around the route, all the mail for the next house is always on top of the stack. The postal carrier takes the sheets or bundles of mail for that house and simply puts it in the mailbox. Steps S11, S12, S13, and S14 take place in alternative embodiments described below.

Mail can be sent very quickly this way. A sender may be on the East Coast and a recipient on the West Coast. The print job is routed to the appropriate city in the West Coast, where it is printed and delivered. The recipient receives the mail promptly; e.g., the next day, even though it was mailed on the other side of the country. The Post Office is saved from having to actually haul a paper letter across the country using trucks and planes, and saved from the handling of the mail at each junction along the way.

In some embodiments, printers 44 are provided in or supported by postal delivery vehicles 46 (see FIG. 1) such as mail delivery trucks or Jeeps™ and mail pieces are printed out from print jobs, for at least some of the multiple recipients for a print job, on the printer 44 in the postal delivery vehicle 46. In some embodiments, the mail pieces are printed in an order at least partly corresponding to the delivery route for the postal delivery vehicle. More particularly, in the illustrated embodiment, a wireless communication link 52 is provided between at least one of the postal facilities 14 and a postal delivery vehicle 46.

In the illustrated embodiment, computers 48 are provided in or supported by the postal delivery vehicles 46, coupled to the printers 44, and the printers 44 are in wireless communication with the postal facilities 14 via the computers 48.

In one embodiment, a print job is printed (e.g., just-in-time or no more than one or two houses) before the postal delivery vehicle arrives at an address of an addressee. In some embodiments, some or all computers 48 are pre-programmed (programmed in advance of arriving at the location of the next addressee) with data describing the postal vehicle 46 delivery route and the printer 44 prints out print jobs in the vehicle delivery route order based on the pre-programmed data. In other embodiments, a GPS receiver 50 is supported from at least one of the postal delivery vehicles 46 and is coupled to the computer 48. The computer 48 is configured to determine which of the addressees the postal vehicle is approaching, using the GPS receiver, and to cause printing out of a print job for the addressee that the vehicle is approaching.

The wireless link 52 can be of any known type or format, such as a data type associated with any mobile phone service provider, WiFi, Bluetooth, microwave, or satellite, etc. In some embodiments, one or more postal delivery vehicles are associated with a given postal facility 14. The computer 48 supported by a postal delivery vehicle 46 and the associated postal facility 14 have appropriate cooperating hardware to define the wireless link. It may or may not be possible to establish the wireless communication link during the entire delivery route of the postal delivery vehicle but, while communications are established, multiple electronic mail pieces can be transferred from the postal facility 14 to the postal delivery vehicle 46.

In some embodiments, some of the mail pieces are printed out at one of the postal facilities 14 and loaded into the vehicle at that postal facility 14, and other mail pieces are printed out in the postal delivery vehicle 46.

Some postal delivery vehicles may not be able to carry big printers with them, but can support a medium or small printer. In some embodiments, the postal facilities 14 determine how many sheets on average could be printed without slowing the postal delivery vehicle in its route waiting for printouts. In these embodiments, most of the printing might be performed (e.g., during the night) at the postal facility 14. But by having a printer on the postal delivery vehicle 46, last-minute first class mail can come through and be delivered. Mail sent at, for example, 4 PM on the East Coast can be delivered to a recipient on the West Coast where the mail truck comes around after 1 PM. For an extra fee, the postal carrier could backtrack, if necessary, to be sure the recipient gets mail printed in the postal delivery vehicle that day.

Thus, in alternative embodiments, the process of FIG. 3 is modified by inserting steps S11, S12, S13, and S14 between steps S9 and S10.

In step S11, bundles of mail pieces printed in a postal facility 14 (and conventional mail) are loaded in a postal delivery vehicle 46.

In step S12, electronic mail pieces are forwarded from the postal facility 14 to the postal delivery vehicle 46 via a wireless link 52.

In step S13, the computer 48 determines which addressee or addresses is or are being approached by the postal deliver vehicle 46. More particularly, as the postal delivery vehicle 46 drives around, the computer 48 knows where on the route it is because the postal carrier keeps it informed, or by using an attached GPS device 50, or some other method.

In step S14, mail is printed in the vehicle for an addressee whose location is being approached by the postal delivery vehicle 46. In some embodiments, the postal vehicle will backtrack or vary its route to deliver a piece of mail that was printed after an addressee's location has been passed, as described above (e.g., for an additional fee).

FIG. 4 illustrates alternative embodiments. FIG. 4 shows a computer 36 coupled, for example, to a server 30 configured to electronically receive a print job and a list of addresses as described above. The server is configured to define multiple separate individually addressed electronic mail pieces as described above.

The server 30 electronically routes the individually addressed electronic mail pieces to respective postal facilities 14. The postal facilities are selected based on proximity to the addresses of the individually addressed pieces as described above.

Any of various alternative means can be provided for electronically defining postal delivery routes for respective postal facilities. The mail pieces are then printed out at a postal facility (e.g., one, two, or more times each night, after hours, or at other specified times), based on the defined delivery route.

In some embodiments, means for defining a delivery route 57 (see FIG. 5) comprises a computer 36 (see FIG. 4) configured to electronically receive natural language descriptions of a route and to translate the natural language descriptions to an addressee sort order for printing out of the mail pieces.

The computer 36 figures out the house number ordering from the natural language description. The following is an example natural language description of the route 57 shown in FIG. 5:

Start at 1200 Bob St doing the mail boxes on the right side of street.
Turn right onto Sue Ct doing the right side.
At the end of Sue Ct, turn around and go back, again doing the right side.
Turn right onto Bob St doing right side.
Turn right onto Amy Dr doing both sides of the street.

This will make it easier for a less-skilled worker to program into the computer 36 the information needed so that the computer 36 can sort the mail pieces in the order of delivery.

This has the advantage that it is easy to change as delivery truck routes change, as new streets are added, etc. This allows for quick changes as necessary.

The computer 36 knows (e.g., is programmed by more skilled people at first) that, for example, Bob St. starts at 1200 and goes up. It knows that, for example, the odd numbers are on the right side of the road (even numbered-houses on the other side coming back). It knows that, for example, Sue Ct is between houses 1345 and 1367 Bob St so it will print Bob St up to 1345, then the Sue Ct cul-de-sac, then resuming Bob St at 1367, and so on.

In other embodiments, the means for defining a delivery route for a postal facility comprises a computer 36 or 106 (see FIG. 4) defining a graphical user interface 54 or 108 configured to present a map 56 (see FIG. 5) having streets 58, 60, 62 displayed thereon to an operator, with which the operator can trace a pattern (e.g., along at least portions of route 57) on the map 56 to define a carrier route. The computer 36 converts the traced pattern to a sequence of addresses corresponding to the carrier delivery route. The operator or user (e.g., a postal official) at a computer screen pulls up a map and draws with a mouse or other pointing device (or on a touchscreen) the route taken. The computer 36 then figures out house order from that. For example, in FIG. 5, the house order would be the street addresses corresponding to houses 64, 66, 68, and 70 on Bob St., followed by the street addresses corresponding to houses 72, 74, 76, 78, 80, and 82 on Sue Ct., followed by the street addresses corresponding to houses 84, 86, and 88 on Bob St., followed by the street addresses corresponding to houses 90, 92, 94, 96, 98, 100, etc., on Amy Dr., respectively.

In other embodiments, the means for defining a delivery route comprises a GPS receiver or device 102 (see FIG. 4) supported from a postal delivery vehicle 104 to track (record over time) GPS locations of a postal delivery vehicle route. The GPS receiver 102 is placed on the postal delivery vehicle (e.g., for a day) and monitors (records coordinates during) its route. That information is downloaded later or in real time into the computer 36 or 106 and the mail delivery order (e.g., by street address: 1200 Sue. St., 1202 Sue St., 1204 Sue St., etc.) is determined from that by the computer 36 or 106.

In other embodiments, the computer 36 or 106 (see FIG. 4) displays houses on a screen (see FIG. 5). The user (e.g., a postal official, driver, or programmer) finds a first house on a route (e.g., 66), and clicks on it or otherwise selects it. The computer 36 or 106 then shows the houses 64, 66, 110, 112, 114 in both directions and on both sides of the street. The user then clicks on the second house (e.g., 68). The computer then knows which direction to go and whether both sides or just one side of the street is being covered. If alternating sides of the street are to be designated, or in complicated situations, the computer may not know the direction until a third or later house is selected, after which a direction is determined. After a direction is determined, when an intersection 116 comes up, the computer 36 or 106 displays houses in all directions. The user can then click on a house straight ahead (eg., 84), to the left (e.g., 118), or to the right (e.g., 72). After one, two, or more selections, the computer will determine the direction. The computer keeps presenting and the user keeps clicking or selecting until the whole route is entered. Of course, if there are any jumps in the route, the user can override the houses presented and click on or enter the address of the next location, in which case, the computer moves there and starts displaying those surrounding houses.

FIG. 6 illustrates alternative embodiments of the invention. The Post Office has a service where mail is delivered only when the recipient signs for it. The sender specifies a parameter to request a signature. For example, certified mail, registered mail, or express mail service is requested, all of which require that the recipient (or perhaps an agent) sign for a piece of mail before it will be delivered. There are other differences between these three types of services, such as the care with which movement of a piece of mail is tracked or speed of delivery which are not relevant to this discussion.

In accordance with some embodiments, mail items generated using the system or methods described above are not printed until the recipient signs it, at which time it is allowed to be printed.

In some embodiments, the postal carrier in the truck arrives at the recipient's home. If the recipient is there, the recipient signs for it, and the postal carrier instructs a postal facility 14 to send the mail item for the recipient to the printer in the postal vehicle 104. The recipient is then given the mail item. If the recipient is not home, a notice is left. The recipient can then go to the local postal facility 14, sign for it, and have the mail item printed there.

In the embodiments shown in FIG. 6, many of the steps are similar to those shown in FIG. 3, like reference numerals indicating like steps. In step S15, a signature slip is prepared. This is a paper signature slip in some embodiments, and an electronic signature slip in others. For example, a wireless device can be used to capture signatures or secure IDs of recipients.

In step S16, a determination is made (e.g., manually) as to whether the addressee is home. If so, the process proceeds to step S17. If not, the process proceeds to step S18.

In step S17, a determination is made (e.g., electronically or manually) as to whether the addressee signed for a mail item. If so, in one embodiment, the process proceeds to step S14 in which the item is printed. In alternative embodiments, the item is printed (in a mail delivery vehicle or in a postal facility) before an addressee is asked to sign for it.

In step S18, a notice is left (e.g., indicating that the addressee can pick up the mail item at a postal facility 14 or electronically upon signing for it). The steps shown in FIG. 6 or similar steps can be carried out using a server, such as the server 30 shown in FIG. 1.

In some embodiments, recipients can log on to their respective accounts on a postal facility web site and, using any one of several methods for secured IDs, sign for the mail item. The mail item will then be printed and delivered in due course. With conventional mail, the signing can mean that the postal facility guarantees that the recipient has actually received the mail item. Having a recipient sign one day and delivering the mail item later does not guarantee that the recipient actually received the mail item. Therefore, in some embodiments, after the recipient signs for it, the web site pulls up the mail item and presents it to the user then and there.

Server logic, in accordance with some embodiments, is shown in FIG. 7. In step S20, a server receives a request for an item of mail.

In step S21, the server requests authentication or a secure ID. This could be a digital certificate, user name and password, request for a driver's license or other ID number, request for home address, etc.

In step S22, the server determines whether the user has provided the proper credentials or otherwise has been authenticated. If so, the server proceeds to step S23. It not, the server proceeds to step S24.

In step S23, the server retrieves and displays the item of mail (e.g., in a web browser) and processing stops for this request.

In step S24, an error message is displayed. After performing step S24, the server proceeds to step S21 or displays a home page or exit page.

FIG. 8 illustrates further alternative embodiments. With email, one can send an email to one email address, e.g. JonesFamily@YahooGroups.com, and it will be forwarded to everybody in that group distribution list. Using the method illustrated in FIG. 8, a mail group can be created, Jones Family, 123 Group Street, Grouptown, Calif., 99999. An address sent to a server (e.g., the server 30) with such a format or coding indicating a group is intended would then be expanded into many addresses. Alternatively, a field or flag can be used to indicate that a print job is intended for distribution to a group.

In some embodiments, certain groups will contain both electronic addresses (e-mail addresses) as well as conventional addresses at which paper copies are received. This way, Aunt Martha, who is computer illiterate, will get her family mail on paper. Whereas cousin Billy, who receives all his mail electronically, can read it online. Alternatively, postal customers may register their preferences as to whether they would like to receive mail in paper format or electronic format in advance; e.g., by filling out a form on a web page, filling a form in a postal facility, calling or visiting the postal facility, or by otherwise contacting the postal facility. In some embodiments, like with email groups, a list moderator can monitor the print jobs or mails, add/delete addresses, and/or control who can send to the group (anybody, members only, etc.)

Thus, FIG. 8 illustrates-modifications made to a method such as the one shown in FIG. 3, like reference numerals indicating like steps. Steps S27, S28, and S29 are performed for each address, in the illustrated embodiment.

In step S27, a determination is made as to whether an address is an address for a group (as indicated by a coded city name, zip code, flag, or other indicator). If so, process flow proceeds to step S28. If not, the address is handled in the manner shown in FIG. 3 from step S2 onward.

In step S28, the group address is exploded into multiple postal addresses and electronic addresses (e.g., e-mail addresses, instant message addresses).

In step S29, mail pieces addressed to electronic addresses are delivered electronically (e.g., to an e-mail address, instant message address, via a web site). After step S29, mail pieces addressed to postal addresses are handled in the manner shown in FIG. 3 from step S2 onward.

In the method of FIG. 8, and other methods described herein, the order of certain steps can readily be rearranged, as will be apparent to those of ordinary skill in the art. For example, mail pieces addressed to postal addresses could be handled before or simultaneously with handling of electronic addresses.

In alternative embodiments, such groups are implemented outside of the Post Office. A web site, similar to existing commercial groups websites, is not only able to have email addresses on the list, but regular street addresses too. Any email sent to that group will be sent electronically to those with email addresses. For those with postal addresses, a mail will be sent in accordance with any of the methods described above, particularly those described in connection with FIG. 3 or FIG. 6. This is particularly useful for groups such as soccer moms, church groups, etc., so that only one person needs to maintain a list that several people need to use.

In some embodiments, for security reasons, forwarding to a group exploder would not be allowed. This prevents inadvertent or malicious forwarding of confidential information to many addressees. Senders can mark mail as "noexploder" (e.g. bank statements, bills, etc.). In some embodiments, all exploder addresses include a city name such as Grouptown, or Groupcity or use a fictitious zip code indicating a list, so that senders are completely aware that the mail is going to more than one addressee. This helps prevent malicious companies from requesting a credit card number be sent to an address, which turns out to be an exploding address. In some embodiments, secured email (e.g. bank statements, user sending personal information such as credit card info, etc,) cannot be forwarded.

In some embodiments, the steps shown in FIG. 8 (or alternatives) are carried out using a server, such as the server 30 shown in FIG. 1.

An advantage of the systems and methods disclosed herein is that cost and time for the senders are reduced in that no folding of paper, no stuffing of envelopes, no addressing of envelopes, and no licking of stamps by senders is necessary. Also, the cost, time, and handling by the Post Office of these mail items are reduced. Mail can be delivered rapidly or even just in time in embodiments where mail items are printed in a postal vehicle. Another advantage is that recipients are not required to have email, an Internet connection, or even a computer.

In compliance with the patent statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms of modifications within the proper scope of the appended claims appropriately interpreted in accordance with the doctrine of equivalents.

What is claimed is:

1. A method of distributing mail, comprising:
electronically transmitting a print job, and a list of postal addresses of multiple recipients to which the print job is desired to be delivered, from a user's location;

providing a printer in a postal delivery vehicle; and printing out mail pieces from the print job, for at least some of the multiple recipients, on the printer in the postal delivery vehicle.

2. A method of distributing mail in accordance with claim 1 wherein the mail pieces are printed in an order at least partly corresponding to a delivery route for the postal delivery vehicle.

3. A method of distributing mail in accordance with claim 2 and further comprising routing the print job to respective postal facilities separate from the user's location, the postal facilities being selected based on the postal addresses, providing a wireless communication link between one of the postal facilities and the postal delivery vehicle.

4. A method of distributing mail in accordance with claim 1 and further comprising supporting a GPS receiver from the postal delivery vehicle and coupling the GPS receiver to the computer, wherein the computer is configured to determine which of the addressees the postal vehicle is approaching, using the GPS receiver, and to cause printing out of a print job for the addressee that the vehicle is approaching.

5. A method of distributing mail in accordance with claim 3 wherein some of the mail pieces are printed out at one of the postal facilities and loaded into the vehicle at that postal facility, and other mail pieces are printed out in the postal delivery vehicle.

6. A method of distributing mail in accordance with claim 3 and further comprising providing a computer in the postal delivery vehicle, coupled to the printer, wherein the printer is in wireless communication with the postal facility via the computer.

7. A method of distributing mail in accordance with claim 6 wherein the computer is programmable with data describing the postal vehicle delivery route, and wherein the printer prints out print jobs in the vehicle delivery route order based on the programmed data.

8. A method of distributing mail in accordance with claim 3 wherein a print job is printed just-in-time before the postal delivery vehicle arrives at an address of an addressee.

9. A method of distributing mail in accordance with claim 6 wherein the computer is programmable with data describing the postal vehicle delivery route using a graphical user interface that displays a map that a user can interact with to program the data, and wherein the printer prints out print jobs in the vehicle delivery route order based on the programmed data.

10. A system for distributing mail, comprising:

a server configured to receive, from a user's client machine, an electronically transmitted print job, and a list of postal addresses of multiple recipients to which the print job is desired to be delivered, from a user's location;

a plurality of computers in respective postal facilities, at least selectively coupled to the server, the server being configured to electronically route at least portions of the print job to selected ones of the computers based, at least in part, on proximity of the postal facilities to the respective recipients; and a printer configured to be supported by a postal delivery vehicle associated with one of the postal facilities, the printer being selectively wirelessly coupled to the computer in the associated postal facility and configured to print out at least some mail pieces from the print job that were electronically routed to the associated postal facility.

11. A system for distributing mail in accordance with claim 10 wherein a print job is printed before the postal delivery vehicle arrives at an address of an addressee.

12. A system for distributing mail in accordance with claim 10 wherein some of the mail pieces are printed out at one of the postal facilities and loaded into the vehicle at that postal facility, and other mail pieces are printed out in the vehicle.

13. A system for distributing mail in accordance with claim 10 wherein the printer configured to be supported in the postal delivery vehicle is configured to print in an order at least partly corresponding to a delivery route for the postal delivery vehicle.

14. A system for distributing mail in accordance with claim 13 and further comprising a computer coupled to the printer and configured to be supported by the postal vehicle, wherein the printer is wirelessly coupled to the computer in the postal facility via the computer configured to be supported by the postal delivery vehicle.

15. A system of distributing mail in accordance with claim 14 and further comprising a GPS receiver configured to be supported from the postal delivery vehicle and coupled to the computer configured to be supported by the postal delivery vehicle, wherein the computer configured to be supported by the postal delivery vehicle is configured to determine which of the addressees the postal delivery vehicle is approaching, using the GPS receiver, and to cause printing out of a print job for the addressee that the postal delivery vehicle is approaching.

16. A system for distributing mail in accordance with claim 14 wherein the computer configured to be supported by the postal delivery vehicle is pre-programmed with data describing the postal delivery vehicle delivery route and the printer is configured to print out print jobs in the vehicle delivery route order based on the pre-programmed data.

17. A system for distributing mail in accordance with claim 14 wherein the computer defines a graphical user interface with which a user can specify the delivery route by tracing a map on the graphical user interface.

18. A method of distributing mail, comprising:

electronically receiving a print job and a list of addresses of multiple recipients to which the print job is desired to be delivered from a user's location, the print job being mergable with respective addresses of the list to define multiple separate individually addressed electronic mail pieces;

merging the print job with respective addresses of the list to define multiple separate individually addressed electronic mail pieces;

electronically routing the individually addressed electronic mail pieces to respective postal facilities separate from the first user's location, the postal facilities being selected based on proximity to the addresses of the individually addressed pieces;

electronically defining postal delivery routes for respective postal facilities, including electronically receiving natural language descriptions of a route in a computer and translating the natural language descriptions to an addressee sort order for printing out of the mail pieces; and at each postal facility for which an individually addressed electronic mail piece has been received, printing out mail pieces for respective addressees in an order corresponding to the defined delivery route.

19. A method of distributing mail in accordance with claim 18, wherein the natural language descriptions include street names and indications of when and which way to turn.

20. A method of distributing mail in accordance with claim 18, wherein the natural language description is capable of including street names and addresses, indications of when and which way to turn, and an indication of whether mail is to be delivered to all addresses on one side of a portion of a street or the other side or alternating sides.

21. A method of distributing mail, comprising:

electronically receiving a print job and a list of addresses of multiple recipients to which the print job is desired to be delivered from a user's location, the print job being mergable with respective addresses of the list to define multiple separate individually addressed electronic mail pieces;

merging the print job with respective addresses of the list to define multiple separate individually addressed electronic mail pieces;

electronically routing the individually addressed electronic mail pieces to respective postal facilities separate from the first user's location, the postal facilities being selected based on proximity to the addresses of the individually addressed pieces;

electronically defining postal delivery routes for respective postal facilities, including defining a graphical user interface configured to present a map having streets displayed thereon to an operator, with which the operator can trace a pattern on the map to define a carrier route;

converting the traced pattern to a sequence of addresses corresponding to the carrier route; and at each postal facility for which an individually addressed electronic mail piece has been received, printing out mail pieces for respective addressees in an order corresponding to the defined delivery route.

22. A method of distributing mail in accordance with claim 21 wherein the graphical user interface is configured to display opposite sides of streets, and wherein an operator can define a carrier route to a precision level in which sides of streets can be specified.

23. A method of distributing mail in accordance with claim 21 wherein the graphical user interface is configured to display opposite sides of streets, and wherein an operator can define a carrier route to a precision level in which an order of individual houses to be included can be specified.

24. A method of distributing mail, comprising:

electronically receiving a print job and a list of addresses of multiple recipients to which the print job is desired to be delivered from a user's location, the print job being mergable with respective addresses of the list to define multiple separate individually addressed electronic mail pieces;

merging the print job with respective addresses of the list to define multiple separate individually addressed electronic mail pieces;

electronically routing the individually addressed electronic mail pieces to respective postal facilities separate from the first user's location, the postal facilities being selected based on proximity to the addresses of the individually addressed pieces;

electronically defining postal delivery routes for respective postal facilities, including supporting a GPS unit from a postal delivery vehicle, and tracking GPS locations of a postal delivery vehicle route; and at each postal facility for which an individually addressed electronic mail piece has been received, printing out mail pieces for respective addressees in an order corresponding to the defined delivery route.

25. A method of distributing mail in accordance with claim 24 wherein the tracking of GPS locations of a postal delivery vehicle route takes place in a set-up run, and wherein the method further comprises converting the GPS locations to postal addresses.

26. A method of distributing mail, comprising:

electronically receiving a print job and a list of addresses of multiple recipients to which the print job is desired to be delivered from a user's location, the print job being mergable with respective addresses of the list to define multiple separate individually addressed electronic mail pieces;

merging the print job with respective addresses of the list to define multiple separate individually addressed electronic mail pieces;

electronically routing the individually addressed electronic mail pieces to respective postal facilities separate from the first user's location, the postal facilities being selected based on proximity to the addresses of the individually addressed pieces;

electronically defining postal delivery routes for respective postal facilities including defining a graphical user interface configured to present a map having streets displayed thereon to an operator, wherein the graphical user interface is configured to display icons representing houses on opposite sides of streets, and wherein an operator can define a carrier route by selecting housing using the graphical user interface; and at each postal facility for which an individually addressed electronic mail piece has been received, printing out mail pieces for respective addressees in an order corresponding to the defined delivery route.

27. A method of distributing mail, comprising:

electronically receiving a print job and a list of addresses of multiple recipients to which the print job is desired to be delivered from a user's location, the print job being mergable with respective addresses of the list to define multiple separate individually addressed electronic mail pieces;

merging the print job with respective addresses of the list to define multiple separate individually addressed electronic mail pieces;

electronically routing the individually addressed electronic mail pieces to respective postal facilities separate from the first user's location, the postal facilities being selected based on proximity to the addresses of the individually addressed pieces;

electronically defining postal delivery routes for respective postal facilities, including defining a graphical user interface configured to present a map having streets displayed thereon to an operator, wherein, in response to two adjacent houses being selected in a row on the graphical user interface, a direction is automatically determined; and at each postal facility for which an individually addressed electronic mail piece has been received, printing out mail pieces for respective addressees in an order corresponding to the defined delivery route.

28. A method of distributing mail in accordance with claim 27 wherein, in response to two adjacent houses being selected in a row on the graphical user interface, a direction is automatically determined and the graphical user interface displays icons representing houses at the next intersection and, in response to selection of at least one of the icons at the intersection, determines a direction for continuation of the carrier route.

29. A system for distributing mail, comprising:
a server configured to electronically receive a print job and a list of addresses of multiple recipients to which the print job is desired to be delivered from a user's client machine, the print job being mergable with respective addresses of the list to define multiple separate individually addressed electronic mail pieces, the server being further configured to merge the print job with respective addresses of the list to define multiple separate individually addressed electronic mail pieces;
means for electronically routing the individually addressed electronic mail pieces to respective postal facilities separate from the first user's location, the postal facilities being selected based on proximity to the addresses of the individually addressed pieces;
means for electronically defining postal delivery routes for respective postal facilities including a computer configured to electronically receive natural language descriptions of a route and to translate the natural language descriptions to an addressee sort order for printing out of the mail pieces; and
means for printing out mail pieces for respective addressees in an order corresponding to the defined delivery route at each postal facility for which an individually addressed electronic mail piece has been received.

30. A system for distributing mail in accordance with claim 29 wherein the natural language descriptions include including street names and indications of when and which way to turn.

31. A system for distributing mail in accordance with claim 29 wherein the natural language description is capable of including street names and addresses, indications of when and which way to turn, and an indication of whether mail is to be delivered to all addresses on one side of a portion of a street or the other side or alternating sides.

32. A system for distributing mail, comprising:
a server configured to electronically receive a print job and a list of addresses of multiple recipients to which the print job is desired to be delivered from a user's client machine, the print job being mergable with respective addresses of the list to define multiple separate individually addressed electronic mail pieces, the server being further configured to merge the print job with respective addresses of the list to define multiple separate individually addressed electronic mail pieces;
means for electronically routing the individually addressed electronic mail pieces to respective postal facilities separate from the first user's location, the postal facilities being selected based on proximity to the addresses of the individually addressed pieces;
means for electronically defining postal delivery routes for respective postal facilities, including means for defining a graphical user interface configured to present a map having streets displayed thereon to an operator, with which the operator can trace a pattern on the map to define a carrier route, and means for converting the traced pattern to a sequence of addresses corresponding to the carrier route; and
means for printing out mail pieces for respective addressees in an order corresponding to the defined delivery route at each postal facility for which an individually addressed electronic mail piece has been received.

33. A system for distributing mail in accordance with claim 32 wherein the means for defining a graphical user interface is configured to display opposite sides of streets, and wherein an operator can define a carrier route to a precision level in which sides of streets can be specified.

34. A system for distributing mail in accordance with claim 32 wherein the graphical user interface is configured to display opposite sides of streets, and wherein an operator can define a carrier route to a precision level in which an order of individual houses to be included can be specified.

35. A system for distributing mail, comprising:
a server configured to electronically receive a print job and a list of addresses of multiple recipients to which the print job is desired to be delivered from a user's client machine, the print job being mergable with respective addresses of the list to define multiple separate individually addressed electronic mail pieces, the server being further configured to merge the print job with respective addresses of the list to define multiple separate individually addressed electronic mail pieces;
means for electronically routing the individually addressed electronic mail pieces to respective postal facilities separate from the first user's location, the postal facilities being selected based on proximity to the addresses of the individually addressed pieces;
means for electronically defining postal delivery routes for respective postal facilities, including a GPS receiver supported from a postal delivery vehicle to track GPS locations of a postal delivery vehicle route; and
means for printing out mail pieces for respective addressees in an order corresponding to the defined delivery route at each postal facility for which an individually addressed electronic mail piece has been received.

36. A system for distributing mail, comprising:
a server configured to electronically receive a print job and a list of addresses of multiple recipients to which the print job is desired to be delivered from a user's client machine, the print job being mergable with respective addresses of the list to define multiple separate individually addressed electronic mail pieces, the server being further configured to merge the print job with respective addresses of the list to define multiple separate individually addressed electronic mail pieces;
means for electronically routing the individually addressed electronic mail pieces to respective postal facilities separate from the first user's location, the postal facilities being selected based on proximity to the addresses of the individually addressed pieces;
means for electronically defining postal delivery routes for respective postal facilities including means for defining a graphical user interface configured to present a map having streets displayed thereon to an operator, wherein the graphical user interface means is configured to display icons representing houses on opposite sides of streets, and wherein an operator can define a carrier route by selecting housing using the graphical user interface means; and
means for printing out mail pieces for respective addressees in an order corresponding to the defined delivery route at each postal facility for which an individually addressed electronic mail piece has been received.

37. A system for distributing mail, comprising:
a server configured to electronically receive a print job and a list of addresses of multiple recipients to which the print job is desired to be delivered from a user's client machine, the print job being mergable with respective addresses of the list to define multiple separate individually addressed electronic mail pieces, the server being further configured to merge the print job with respective addresses of the list to define multiple separate individually addressed electronic mail pieces;

means for electronically routing the individually addressed electronic mail pieces to respective postal facilities separate from the first user's location, the postal facilities being selected based on proximity to the addresses of the individually addressed pieces;

means for electronically defining postal delivery routes for respective postal facilities, including means for defining a graphical user interface configured to present a map having streets displayed thereon to an operator, and means for, in response to two adjacent houses being selected in a row on the graphical user interface means, automatically determining a direction; and means for printing out mail pieces for respective addressees in an order corresponding to the defined delivery route at each postal facility for which an individually addressed electronic mail piece has been received.

38. A system for distributing mail in accordance with claim 37 wherein in response to two adjacent houses being selected in a row on the graphical user interface, a direction is automatically determined and the graphical user interface means displays icons representing houses at the next intersection and, in response to selection of at least one of the icons at the intersection, determines a direction for continuation of the carrier route.

39. A method of distributing mail, comprising:

electronically transmitting a print job, and a list of postal addresses of multiple recipients to which the print job is desired to be delivered, from a user's location;

providing a printer in a postal delivery vehicle;

printing out mail pieces from the print job, for at least some of the multiple recipients, on the printer in the postal delivery vehicle; and delivering a mail piece to one of the multiple recipients after that recipient has signed for the mail piece.

40. A method of distributing mail in accordance with claim 39, and further comprising requiring an addressee to sign for a mail piece before it is printed in the postal delivery vehicle.

41. A method of distributing mail in accordance with claim 39 and further comprising providing a web site with which an addressee can sign for a mail piece.

42. A method of distributing mail in accordance with claim 41 and further comprising displaying an electronic version of a mail piece in response to the addressee signing for the item of mail using the web site.

43. A method of distributing mail, comprising:

electronically receiving a print job and a list of addresses of multiple recipients to which the print job is desired to be delivered, the addresses including postal addresses and addresses representing groups defining multiple postal and electronic addresses, the print job being mergable with respective addresses to define multiple separate individually addressed electronic mail pieces;

determining if an address on the list of addresses represents a group defining multiple postal and electronic addresses and, if so, exploding the group into the multiple postal and electronic addresses;

merging the print job with respective postal addresses of the list to define multiple separate individually addressed electronic mail pieces;

electronically routing the individually addressed electronic mail pieces from the server to respective distribution centers separate from the first user's location, the distribution centers being selected based on proximity to the addresses of the individually addressed pieces; and at each distribution center for which an individually addressed electronic mail piece has been received, printing out mail pieces for respective addressees in an order corresponding to a predetermined delivery route.

44. A method in accordance with claim 43 and further comprising electronically distributing electronic mail pieces to the electronic addresses.

45. A method in accordance with claim 43 and further comprising e mailing electronic mail pieces to the electronic addresses.

46. A method in accordance with claim 43 wherein determining if an address on the list of addresses represents a group comprises determining if that address includes indicia indicating that a group is indicated.

47. A method in accordance with claim 43 wherein determining if an address on the list of addresses represents a group comprises determining if that address includes a fictitious city name designated as a name identifying that a group is intended.

* * * * *